A. E. SCHATZ.
Vault-Covers.
No. 148,247.  Patented March 3, 1874.
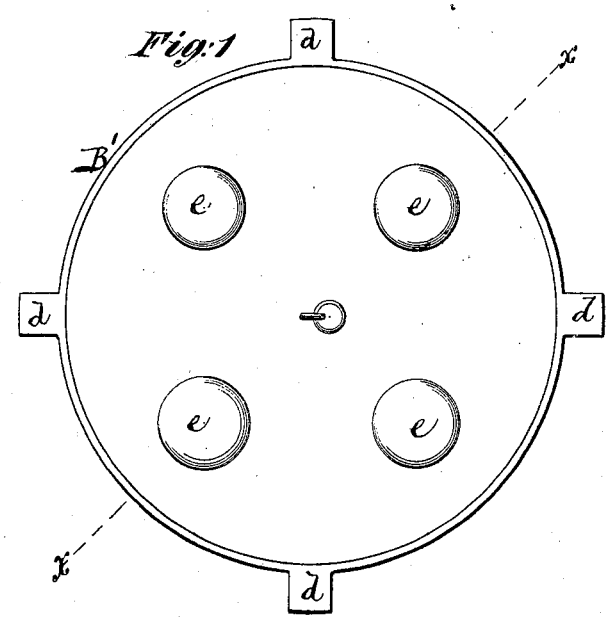
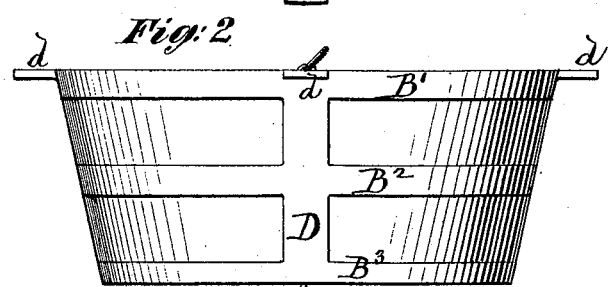
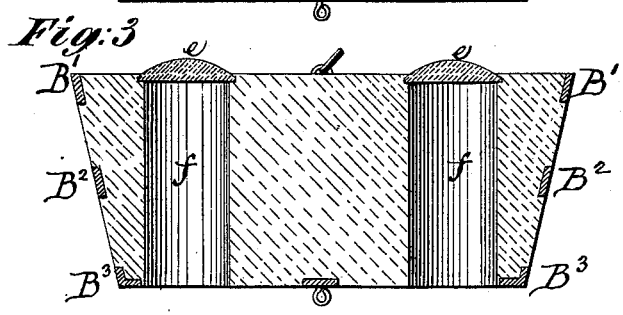
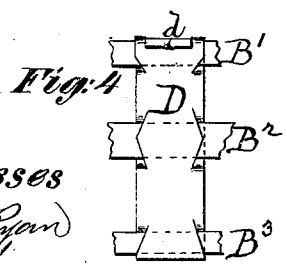
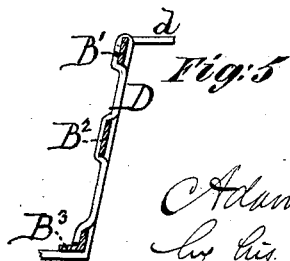
Witnesses
Michael Ryan
Fred. Haynes
Adam E. Schatz
by his attorneys
Brown & Allen

UNITED STATES PATENT OFFICE.

ADAM E. SCHATZ, OF NEW YORK, N. Y.

IMPROVEMENT IN VAULT-COVERS.

Specification forming part of Letters Patent No. 148,247, dated March 3, 1874; application filed January 23, 1874.

*To all whom it may concern:*

Be it known that I, ADAM E. SCHATZ, of New York, in the county and State of New York, have invented an Improved Cover for Coal-Slides and other Openings in Pavements, of which the following is a specification:

My invention consists in a basket or frame-work made of cast or wrought iron, and filled with cement or suitable composition, and provided with lugs for engagement with depressions in the pavement, for the purpose of holding it in place, the cover thus formed being provided with illuminators or not, as may be preferred.

In the accompanying drawing, Figure 1 is a top view of my improved cover. Fig. 2 is a side view of the same. Fig. 3 is a vertical section taken on the line $x\,x$ of Fig. 1. Figs. 4 and 5 are detailed views hereinafter particularly referred to.

The basket or frame-work may be made of cast or wrought iron, as may be preferred. It is formed with an upper band, $B^1$, a middle band, $B^2$, and a lower band, $B^3$, which latter is of angular shape, so as to extend under the bottom as well as around the periphery. These bands are connected to and held in place by two bars, D D, which cross each other at right angles midway of their length, and are bent upward and have their extreme ends turned outward to form lugs $d$.

When made of cast-iron, the bands and bars are all cast together in one piece. The basket or frame-work thus formed is then filled with cement or suitable composition in a plastic state, the basket being placed in a suitable mold, if necessary, so that the composition will be flush with the outer periphery of the bands. When the cement or composition is sufficiently dry and hard, it forms, with the basket, a solid plug, with the lugs $d$ extending outward for engagement with depressions in the pavement surrounding the opening, thus holding it in place equally as well as the circular flange in common use, and at the same time preventing any rotary motion.

The plug or cover thus formed is preferably made slightly tapering downward toward the center, so as to facilitate its removal when necessary.

It may be provided with illuminators consisting of glass disks or plates $e$ inserted in the top of the plug at the upper ends of tubular openings $f$, made for the purpose. These tubular openings may be made and the illuminators inserted while the cement or composition is in a plastic condition, so that the edges of the illuminators will become embedded in the composition, as shown in Fig. 3, and thus be securely held in place.

When the basket is made of wrought-iron, the bands and bars may be made of flat bar-iron, the bands passing through slits or slots, or under and over lugs formed in or on the bars, as shown in Figs. 4 and 5, and may be riveted at their intersections, if desired.

The outline of the cover may be either circular, elliptical, or polygonal, according to the shape of the opening.

By having it supported in place by means of lugs instead of a circular flange, a comparatively small amount of metal is exposed, so that the danger of slipping thereon experienced by pedestrians is less than that resulting from the use of a circular flange.

What I claim as new, and desire to secure by Letters Patent, is—

A cover for coal-slides and other openings in pavements, consisting of an iron basket or frame-work filled with cement or composition, and provided with lugs for engagement with depressions in the pavement for the purpose of holding it in place, substantially as shown and described.

ADAM E. SCHATZ.

Witnesses:
MICHAEL RYAN,
BENJAMIN W. HOFFMAN.